United States Patent [19]

Rand

[11] 4,442,018
[45] Apr. 10, 1984

[54] STABILIZED AQUEOUS FOAM SYSTEMS AND CONCENTRATE AND METHOD FOR MAKING THEM

[75] Inventor: Peter B. Rand, Albuquerque, N. Mex.

[73] Assignee: The United States of America as represented by the United States Department of Energy, Washington, D.C.

[21] Appl. No.: 438,126

[22] Filed: Nov. 1, 1982

[51] Int. Cl.³ .................... B01J 13/00; A62D 1/08; C09K 3/00; A61K 9/00
[52] U.S. Cl. ...................... 252/307; 252/3; 252/382; 252/8.5 C; 424/43
[58] Field of Search .............. 252/307, 3, 382; 424/43

[56] References Cited

U.S. PATENT DOCUMENTS

| | | |
|---|---|---|
| 3,422,011 | 1/1969 | Jackovitz ................... 252/3 |
| 3,634,233 | 1/1972 | Hiltz ........................ 252/3 |
| 3,718,609 | 2/1973 | Weimer .................. 252/307 X |
| 3,959,160 | 5/1976 | Horsler .................. 252/307 X |
| 4,088,583 | 5/1978 | Pyle .................... 252/8.5 C X |
| 4,118,526 | 10/1978 | Gregorian ............... 252/307 X |
| 4,284,601 | 8/1981 | Chay ..................... 252/382 X |
| 4,334,877 | 6/1982 | Gregorian ............... 252/307 X |

Primary Examiner—Richard D. Lovering
Assistant Examiner—Catherine S. Kilby
Attorney, Agent, or Firm—Armand McMillan; Albert Sopp; Michael F. Esposito

[57] ABSTRACT

This invention comprises a combination of a water soluble polymer of the polyacrylic acid type, a foam stabilizer of dodecyl alcohol, a surfactant, a solvent and water as a concentrate for use in producing stabilized aqueous foams. In another aspect, the invention comprises a solution of the concentrate with water. In still another aspect the invention includes a method of generating stabilized aqueous foams.

19 Claims, No Drawings

STABILIZED AQUEOUS FOAM SYSTEMS AND CONCENTRATE AND METHOD FOR MAKING THEM

The U.S. Government has rights in this invention pursuant to contract No. DE-AC04-76DP00789 between the U.S. Department of Energy and Western Electric Company.

BACKGROUND OF THE INVENTION

The invention relates to a solution and concentrate for generating stable aqueous foams, and to a method of generating stable aqueous foams.

Stable high expansion aqueous foams have particular utility when used in security systems, i.e., as a dispensable deterrent for security systems, as visual obscurants because they increase the useful lifetime of the security system. More specifically, they are employed in security systems to prevent access to the unit to be protected by filling up a room to which access is to be prevented with the foams. Other uses of these foams include their use as foam drilling fluids for deep well drilling, as fire fighting agents, as well as other conventional uses which are well known to those skilled in the art.

Typically, the stability of high expansion aqueous foams is determined by measuring the liquid drainage from the foam. This is a measure of the density stability of the foam and is usually reported as the percent drainage at selected times. The present day foam systems in use in security systems give about 50% by weight drainage in 30 min.

The preferred foam systems generally have low solution viscosity so that the foam can be generated by conventional foam generating apparatus of the type wherein the foamable solution is sprayed on a perforated metal screen while blowing air through the screen. This device is conventional, and one example is illustrated in *High Expansion Foam for Shipboard Firefighting*, Fire Technology, vol. 5, 1969. Furthermore, it is desirable that a foam concentrate be storage stable, i.e., capable of being stored for long periods of time and still be effective for generating stable aqueous foams. The concentrate must also be easily mixable with water. However, up to now no system was known which provides all the above enumerated requirements. On the other hand, if a device capable of generating foams from gels is employed, when a low solution viscosity is not necessary. However, the present invention has special applicability to foam generating solution of low viscosity.

OBJECTS OF THE INVENTION

It is thus an object of the present invention to provide a solution for generating a stable high expansion aqueous foam.

Another object of the invention is to provide a corresponding concentrate for use in producing a stable high expansion aqueous foam.

It is also an object to provide a method for generating a stable high expansion aqueous foam.

Upon further study of the specification and appended claims, further objects and advantages of this invention will become apparent to those skilled in the art.

SUMMARY OF THE INVENTION

In accordance with the invention there is provided a concentrate composition for producing a stable high expansion aqueous foam. The concentrate composition comprises a major proportion of water, e.g., about 75% by weight, a polyacrylic acid polymer, a surfactant of sodium lauryl sulfate or alpha olefin sulfonate, a stabilizer of dodecyl alcohol, tetradecanol or hexadecanol, and a solvent. The solvent is typically pentanol, butanol or an isomer thereof. This composition is to be admixed with water to form a solution for generating the stable aqueous foams.

In another aspect, the invention comprises a solution of the above concentrate in an admixture comprising about 98% by weight water. In still another aspect, the invention comprises the method of generating stable aqueous foams which comprises blowing air and spraying the above-described solution through a perforated metal screen.

DETAILED DISCUSSION OF THE INVENTION

High expansion aqueous foams are typically made by spraying a foamable solution on a perforated metal screen while blowing air through the screen, as described in the previously discussed "Fire Technology" article, incorporated by reference herein. Foam systems for this type of commercially available foam generator must have solution viscosities of 10.0 centipoise or less. Thus, low solution viscosity is an important requirement for these type systems. However, as previously discussed when the device employed is capable of generating foams with, e.g., gels, then low viscosity is not necessary, and less water can be employed. As pertaining to the prior art, whereas presently commercially available foam systems give only about 50% by weight drainage in 30 min., the stabilized foam system according to the invention gives typically about 1.5% by weight drainage in 60 min.

In accordance with the invention, it has been discovered that a specific foam stabilizer can be combined with a polyacrylic acid polymer and a surfactant to make stable foams, thereby giving unexpected stability when compared to the prior art. The preferred polymer is a polyacrylic acid type which is commonly used to viscosify or gel aqueous systems for cosmetic and industrial applications. By polyacrylic acid type polymers is meant polyacrylic acid polymers as generally defined in the *Handbook of Water Soluble Gums and Resins* by R. L. Davidson; McGraw Hill 1980, in Chapter 17 thereof. Several polyacrylic acid polymers which are well known are useful in the invention to make the stable foams. However, a preferred polymer is known by the trade name CARBOPOL 941 made by B. F. Goodrich, Inc., and is a water-soluble vinyl polymer having excellent suspending, thickening, and gel-forming properties, and gives a foam with the best properties when combined with the stabilizer and surfactant. Other polymers which can be employed in the invention are known by the trade names, CARBOPOL 801, CARBOPOL 907, CARBOPOL 910, CARBOPOL 934, and CARBOPOL 940. These polymers generally have molecular weights of about 500,000. The stabilizer is preferably n-dodecyl alcohol, tetradecanol or hexadecanol, with n-dodecyl alcohol (lauryl alcohol) being most preferred to stabilize aqueous foams. The surfactants are anionic surfactants such as sodium lauryl sulfate or alpha olefin sulfonate, typically the alpha olefin sulfonates of 12–14 C atoms being preferred. When combined in a solution for generating an aqueous foam, in the proper amounts, the polymer, stabilizer and surfactant provide synergistic results.

In addition to these three components, the preferred composition will also include a solvent such as a $C_2$–$C_5$ alkanol. The solvents preferred are n-butanol, n-pentanol or isomers thereof, with the selection of one of these solvents depending on the properties sought, and is conventional. Other solvents will suffice as will be apparent to those skilled in the art, but the above enumerated give the best results.

The following table lists the typical ranges in percent by weight of the components of a typical solution, with the remainder being water:

| Component | range in % by weight | preferred % value |
|---|---|---|
| Surfactant | 0.3–3% | 0.8% |
| Polymer | 0.2–.5% | 0.2% |
| Stabilizer | 0.1–0.5% | 0.2% |
| Solvent | 0.5–3% | 1.0% |
| Water | 96–99% | 97.8% |

The concentrates of this invention contain these four components in the same relative proportions but in higher absolute percentages since less water is present. The dilution ratio to make the solution is typically 9 to 1, water to concentrate. The amount of water in the concentrate is usually 70–80%. A preferred storage stable concentrate to form a solution comprises about 8.0% surfactant 2–3%, preferably 2% polymer 2–3%, preferably 2% stabilizer, 10.0% solvent and 78% water, preferably deionized water. This concentrate has a viscosity of about 49.3 centipoise.

If the device employed to generate foams is of the type capable of generating foams from gels, then the percentage of water in the concentrate can be less, thus forming a gel concentrate. Typically, at least 50% water is required. More particularly, sufficient water is required to ensure expansion of the polymer so that a solution is formed when diluted with water as opposed to merely a dispersion. When the solution is formed, the solution pH will generally range 2.5–4, depending on the exact constituents and concentrations thereof.

The effects of the combination of polymer and surfactant alone, the stabilizer and surfactant alone, as well as polymer, stabilizer and surfactant in combination are shown in the data on high expansion foams of Table I set forth hereinafter.

In this table, the formulation, solution viscosity, foam density and percent liquid drainage at selected times are given for foams made with (a) a surfactant, (b) surfactant plus solvent, (c) surfactant-polymer-solvent, (d) surfactant-stabilizer-solvent, (e) all ingredients and (f) a commercial foam system. As is evident from said table, there is a significant decrease in liquid drainage when the polymer and stabilizer are combined, as compared to the other combinations. The effects of varying the various concentrations of polymer and stabilizer are also shown in Table I.

Although a specific surfactant is listed in the table, i.e., alpha olefin sulfonate, identified by the tradename SIPONATE 301-10, several anionic surfactants will work in this system as will be obvious to those skilled in the art. This selection is conventional as will be evident from a reading of McCutcheon's *Detergents and Emulsifiers*, North American ed. 1981. However, as previously disclosed the two best types found to date are the sodium lauryl sulfates and the alpha olefin sulfonates. It is preferred to employ the alpha olefin sulfonate in concentrate systems because it is hydrolytically stable in a low pH polymer solution. The surfactant serves to emulsify the dodecyl alcohol, stabilize the films in the foam, and also decreases the solution viscosity for high expansion foam systems. With this in mind, equivalents to the above-surfactants can be selected by those skilled in the art. The effects of three different surfactants, and surfactant concentrations on solution viscosity and liquid drainage are set forth hereinafter in Table II.

As to the solvents employed in the solution, water soluble polar organic solvents such as the alcohols or glycol ethers have been found to be useful additives for reducing viscosity.

TABLE I

POLYMER-STABILIZER SYNERGISM AND CONCENTRATION EFFECTS

| SURFACTANT (1) (% ACTIVE WT) | POLYMER (2) (%/WT) | STABILIZER (3) (%/WT) | SOLVENT (4) (%/WT) | WATER (%/WT) | SOLUTION VISCOSITY (CPS) | FOAM DENSITY (KG/m³) | % LIQUID DRAINAGE AT TIMES (MIN) 5.0 | 15.0 | 30.0 | 60.0 |
|---|---|---|---|---|---|---|---|---|---|---|
| SYNERGISM |||||||||||
| 0.8 | — | — | — | 99.2 | 1.06 | 1.60 | 87.6 | — | — | — |
| 0.8 | — | — | 1.0 | 98.2 | 1.08 | 2.32 | 91.5 | — | — | — |
| 0.8 | 0.2 | — | 1.0 | 98.0 | 6.07 | 2.07 | 7.6 | 81.6 | — | — |
| 0.8 | — | 0.2 | 1.0 | 98.0 | 1.37 | 2.04 | 7.2 | 30.0 | — | — |
| 0.8 | 0.2 | 0.2 | 1.0 | 97.8 | 5.61 | 1.94 | 0 | 0 | 0 | 1.5 |
| PROPRIETARY COMMERCIAL FIRE FIGHTING CONCENTRATE (5) - 6.0%/wt |||| 94.0 | 1.36 | 2.02 | — | 32.5 | 54.4 | — |
| CONCENTRATION EFFECTS |||||||||||
| 0.8 | 0.1 | 0.1 | 1.0 | 98.0 | 2.09 | 2.15 | — | 12.3 | 31.9 | — |
| 0.8 | 0.2 | 0.1 | 1.0 | 97.9 | 5.23 | 2.02 | 0 | 0 | 0 | 3.9 |
| 0.8 | 0.2 | 0.2 | 1.0 | 97.8 | 5.61 | 1.94 | 0 | 0 | 0 | 1.5 |
| 0.8 | 0.2 | 0.3 | 1.0 | 97.7 | 6.21 | 2.38 | 0 | 0 | 0 | 0.9 |

NOTES:
(1) Alpha Olefin Sulfonate, Siponate 301-10
(2) Polyacrylic Acid Polymer, Carbopol 941, B. F. Goodrich
(3) N—Dodecyl Alcohol
(4) N—Butyl Alcohol
(5) MSA Type V, Mine Safety Appliances

TABLE II

SURFACTANT EFFECTS

| | FORMULATION | | | | SOLUTION AND FOAM PROPERTIES | | | | | |
|---|---|---|---|---|---|---|---|---|---|---|
| SURFACTANT (% ACTIVE/WT) | POLYMER (1) (%/WT) | STABILIZER (2) (%/WT) | SOLVENT (3) (%/WT) | WATER (%/WT) | SOLUTION VISCOSITY (CPS) | FOAM DENSITY (KG/$m^3$) | % LIQUID DRAINAGE AT TIMES (MIN) | | | |
| | | | | | | | 5.0 | 15.0 | 30.0 | 60.0 |
| SURFACTANT TYPE | | | | | | | | | | |
| Sodium Lauryl (4) Sulfate (1.0) | 0.2 | 0.2 | 1.0 | 97.6 | 4.50 | 2.34 | 0 | 0 | 0 | 0 |
| Alpha Olefin (5) Sulfonate (0.8) | 0.2 | 0.2 | 1.0 | 97.8 | 5.61 | 1.94 | 0 | 0 | 0 | 1.5 |
| Sulfoalkyl (6) Amide | 0.2 | 0.2 | 1.0 | 97.6 | 3.18 | 1.82 | 0 | — | 10.6 | 33.3 |
| SURFACTANT CONCENTRATION | | | | | | | | | | |
| Alpha Olefin Sulfonate (0.4) | 0.2 | 0.2 | 1.0 | 98.2 | 20.8 | NO FOAMS MADE DUE TO HIGH VISCOSITY | | | | |
| Alpha Olefin Sulfonate (0.6) | 0.2 | 0.2 | 1.0 | 98.0 | 10.7 | NO FOAMS MADE DUE TO HIGH VISCOSITY | | | | |
| Alpha Olefin Sulfonate (0.8) | 0.2 | 0.2 | 1.0 | 97.8 | 5.61 | 1.94 | 0 | 0 | 0 | 1.5 |
| Alpha Olefin Sulfonate (1.0) | 0.2 | 0.2 | 1.0 | 97.6 | 6.24 | 1.70 | 0 | 0 | 0 | 2.9 |
| Alpha Olefin Sulfonate (1.2) | 0.2 | 0.2 | 1.0 | 97.4 | 4.29 | 2.04 | 0 | 0 | 3.0 | 13.7 |

NOTES:
(1) Polyacrylic Acid Polymer, Carbopol 941, B. F. Goodrich.
(2) N—Dodecyl Alcohol
(3) N—Butyl Alcohol
(4) Dudonol ME, E. I. DuPont
(5) Siponate 301-10
(6) Igepon TC-42, GAF Corp.

They are not necessary for stabilizing the foam but are preferred for high expansion foam generation. It is noted that by high expansion is meant expansion ratios of 150/1 to 700/1; converted to density, these ratios are equivalent to 6.6 kg/$m^3$-1.4 kg/$m^3$. Thus, it is seen that the solvent selection is also important because the solvent can have dramatic effects on the solution viscosity and liquid drainage from the foam. The best solvents found to date are 1-butanol, which gives the best drainage with acceptable viscosity, and 1-pentanol which gives the lowest viscosity with acceptable drainage. In addition, isomers of these solvents have also been found effective. The effect of various alcohols and the concentration of an alcohol and a glycol ether as solvents on solution viscosities and liquid drainage are set forth in Table III herein below.

Further effects of the solvents, including isomers of pentanol and butanol are shown in Tables IV and V which follow. In these tables, butanol isomers 3-methyl-1-butanol and 2-methyl-1-butanol are of particular interest as they provide low solution viscosities, low foam densities, and low drainage.

As to the stabilizer employed further tests showed the effect of various chain length fatty alcohols ($C_{12-18}$) on solution viscosity, foam density, and foam liquid drainage and are set forth in Table VI. It is readily seen that dodecanol and tetradodecanol when used as a stabilizer, provide foams having the best drainage stability Hexadecanol has also proven highly effective.

TABLE III

SOLVENT EFFECTS

| | FORMULATION | | | | SOLUTION AND FOAM PROPERTIES | | | | | |
|---|---|---|---|---|---|---|---|---|---|---|
| SURFACTANT (% ACTIVE/WT) | POLYMER (1) (%/WT) | STABILIZER (2) (%/WT) | SOLVENT (%/WT) | WATER (%/WT) | SOLUTION VISCOSITY (CPS) | FOAM DENSITY (KG/$m^3$) | % LIQUID DRAINAGE AT TIMES (MIN) | | | |
| | | | | | | | 5.0 | 15.0 | 30.0 | 60.0 |
| ALCOHOLS | | | | | | | | | | |
| 0.8 (3) | 0.2 | 0.2 | N—Propanol (2.0) | 96.8 | 7.76 | 3.38 | 0 | 0 | 3.8 | 12.4 |
| 0.8 | 0.2 | 0.2 | N—Butanol (1.0) | 97.8 | 5.61 | 1.94 | 0 | 0 | 0 | 1.5 |
| 0.8 | 0.2 | 0.2 | N—Pentanol (1.0) | 97.8 | 3.08 | 2.04 | 0 | 0 | 0 | 7.9 |
| 0.8 | 0.2 | 0.2 | N—Hexanol (1.0) | 97.8 | 2.59 | 1.99 | 61.7 | — | — | — |
| 0.8 | 0.2 | 0.2 | N—Heptanol (1.0) | 97.8 | 3.32 | 4.34 | 83.2 | — | — | — |
| 0.8 | 0.2 | 0.2 | N—Octanol (1.0) | 97.8 | 4.06 | 21.7 | 95.3 | — | — | — |
| SOLVENT CONCENTRATION | | | | | | | | | | |
| 1.0 (4) | 0.2 | 0.2 | N—Butanol (0.5) | | 11.5 | NO FOAM DUE TO HIGH VISCOSITY | | | | |
| 1.0 | 0.2 | 0.2 | N—Butanol (1.0) | | 4.78 | 1.78 | 0 | 0 | 0 | 4.6 |
| 1.0 | 0.2 | 0.2 | N—Butanol (1.5) | | 2.89 | 1.70 | 0 | 0 | 4.5 | 16.8 |
| 1.0 | 0.2 | 0.2 | DGMBE (5)(1.0) | | 7.29 | 3.3 | 0 | — | 4.8 | 16.8 |
| 1.0 | 0.2 | 0.2 | DGMBE (2.0) | | 2.27 | 1.97 | — | 12.0 | 32.3 | — |

NOTES:
(1) Polyacrylic Acid Polymer, Carbopol 941, B. F. Goodrich
(2) N—Dodecyl Alcohol
(3) Alpha Olefin Sulfonate, Siponate 301-10
(4) Sodium Lauryl Sulfate, Duponol ME, E. I. DuPont
(5) Glycol Ether, Diethylene Glycol MonoButyl Ether

TABLE IV

EFFECT OF BUTANOL AND PENTANOL ISOMERS ON STABILIZED AQUEOUS FOAMS

| SOLVENT | SOLUTION VISCOSITY (cps) | FOAM DENSITY (kg/m³) | %/WT DRAINAGE AFTER 1.0 HOUR |
|---|---|---|---|
| 2,2-DIMETHYL-1-PROPANOL | 5.97 | 2.77 | 1.7 |
| 2-PENTANOL | 4.50 | 1.97 | 2.9 |
| 3-METHYL-1-BUTANOL | 3.45 | 1.81 | 3.2 |
| 2-METHYL-1-PROPANOL | 7.37 | 2.79 | 3.6 |
| 3-PENTANOL | 4.86 | 2.38 | 4.0 |
| 2-METHYL-1-BUTANOL | 3.07 | 1.89 | 4.5 |

FORMULATION:
SOLVENT: 1.0%/WT, ALPHA OLEFIN SULFONATE: 0.8%/WT, POLYACRYLIC ACID TYPE POLYMER: 0.2%/WT, DODECANOL: 0.2%/WT, WATER: 97.8%/WT.

TABLE V

EFFECT OF VARIOUS SOLVENTS ON CONCENTRATE AND SOLUTION VISCOSITY, FOAM DENSITY AND FOAM LIQUID DRAINAGE

| SOLVENT | VISCOSITY (cps) CONCENTRATE | VISCOSITY (cps) SOLUTION | FOAM DENSITY (kg/m³) | %/WT DRAINAGE 30 MIN | %/WT DRAINAGE 60 MIN |
|---|---|---|---|---|---|
| 1-PROPANOL | 40.5 | 7.34 | 2.71 | 0.4 | 7.0 |
| 2-METHYL-1-PROPANOL | 52.4 | 7.31 | 2.25 | 0.7 | 5.4 |
| 1-BUTANOL | 54.4 | 4.87 | 2.10 | 2.4 | 9.8 |
| 1,1-DIMETHYL-1-PROPANOL | 60.4 | 6.13 | 2.46 | 0.6 | 7.2 |
| BUTOXYTRIGLYCOL | 71.8 | 4.54 | 1.84 | 2.6 | 12.3 |
| 3-PENTANOL | 74.2 | 5.36 | 2.17 | 1.0 | 8.2 |
| 2-PENTANOL | 84.5 | 4.28 | 2.29 | 0.9 | 9.3 |
| 2,2-DIMETHYL-1-PROPANOL | 86.8 | 4.81 | 2.34 | 2.1 | 10.0 |
| 2-METHYL-1-BUTANOL | 96.1 | 3.83 | 1.79 | 0 | 7.3 |
| 3-METHYL-1-BUTANOL | 120. | 3.79 | 1.87 | 7.8 | 23.0 |
| 1-PENTANOL | 217. | 2.61 | 1.67 | 10.2 | 20.7 |

NOTES:
1. CONCENTRATE FORMULATION - SOLVENT: 10.0%/WT, ALPHA OLEFIN SULFONATE: 10.0%/WT, POLYACRYLIC ACID TYPE POLYMER: 0.2%/WT, DODECANOL: 0.2%/WT, WATER: 76.0%/WT.
2. SOLUTION AND FOAMS MADE WITH 10.0%/WT CONCENTRATE IN WATER.

TABLE VI

EFFECT OF VARIOUS LINEAR FATTY ALCOHOLS ON FOAM DRAINAGE STABILITY

| STABILIZER | SOLUTION VISCOSITY (cps) | FOAM DENSITY (kg/m³) | %/WT LIQUID DRAINAGE 15 MIN | %/WT LIQUID DRAINAGE 30 MIN | %/WT LIQUID DRAINAGE 60 MIN |
|---|---|---|---|---|---|
| DECANOL ($C_{10}OH$) | 3.97 | 1.80 | 74. | — | — |
| DODECANOL ($C_{12}OH$) | 6.78 | 2.29 | 0 | 0 | 1.5 |
| TETRADECANOL ($C_{14}OH$) | 6.23 | 3.31 | 0 | 0 | 5.1 |
| HEXADECANOL ($C_{16}OH$) | 6.69 | 2.59 | 7.7 | 14.1 | 27.9 |
| OCTADECANOL ($C_{18}OH$) | 6.05 | 2.69 | 76.3 | — | — |

FORMULATION:
STABILIZER: 0.2%/WT, POLYACRYLIC ACID TYPE POLYMER: 0.2%/WT, ALPHA OLEFIN SULFONATE SURFACTANT: 0.8%/WT, N—BUTANOL: 1.0%/WT, WATER: 97.8%/WT.

Thus, as seen from the above-tables, the improved system of the invention, although resulting from a combination of polymer, stabilizer, surfactants and solvents, specifically relies on the combination of stabilizer and polymer employed. More particularly, it is readily seen that n-dodecyl alcohol (i.e., lauryl alcohol), tetradodecanol, and hexadecanol are stabilizers resulting in highly unexpected results when compared to the prior art in stabilized aqueous foam systems. More particularly, they provide foams having unexpectedly improved drainage stability over the prior art.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

One example of a concentrate with good storage stability, viscosity less than 100 centipoise, and ability to mix easily with water was formulated as set forth below.

| Ingredient | % by weight |
|---|---|
| alpha olefin sulfonate | 8.0 |
| Carbopol 941 | 2.0 |
| n-dodecyl alcohol | 2.0 |
| n-butyl alcohol | 10.0 |
| deionized water | 78.0 |
|  | 100.0 |

This formulation had a viscosity of 49.3 centipoise and the dilution ratio employed to generate foams was 9 water/1 concentrate.

EXAMPLE 2

A series of high-stability aqueous foam tests with commercial generators were also conducted, more particularly, the basic test set-up employed the MSA 1500E generator which was set up to produce foam in an indoor corridor containing 1,040 cubic feet. The generator delivered the foam through a short duct into the corridor and was tested both with and without a discharge duct grill. Flow of solution to the generator was maintained at 16 gpm, using an automatic flow controller. The foam concentrate to make the solution was that of Example 1.

EXAMPLE 3

In another test, an MSA 3,000 WP generator was located outdoors to produce foam in a 30 ft. by 10 ft. by 8 ft. open top enclosure made of plastic sheet on wood framing. The large premix pump was used and foam solution using the concentrate of Example 1 delivered to the generator at 82 psig or 64 psig.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. A concentrate composition useful for producing a stable high expansion aqueous foam, comprising on a weight basis: an acrylic acid polymer, about 2-3%, dodecyl alcohol, tetradecanol or hexadecanol, about 2-3%; pentanol or butanol, about 10%; a sodium lauryl sulfate or alpha-olefin sulfonate, about 8%; and water, 70-80%.

2. A concentrate composition according to claim 1, wherein said polyacrylic acid polymer is Carbopol 941, and said stabilizer is n-dodecyl alcohol.

3. A concentrate composition according to claim 2, wherein said solvent is 3-methyl-1-butanol.

4. A concentrate composition according to claim 2, wherein said solvent is 2-methyl-1-butanol.

5. A concentrate composition according to claim 2, wherein said solvent is 1-butanol.

6. A concentrate composition according to claim 2, wherein said solvent is 1-pentanol.

7. A concentrate composition according to claim 2, wherein said solvent is 1,1-dimethyl,1,propanol.

8. A concentrate composition as in claim 1, comprising about 2.0% polymer, about 8.0% surfactant, about 2.0% stabilizer, about 10% solvent, and about 78% water.

9. A solution useful for generating stabilized aqueous foams comprising water and the foam concentrate of claim 1, wherein said solution comprises about 96-99% water by weight and the other concentrate constituents comprises the remaining portion by weight of the solution.

10. A solution as in claim 9, comprising about 0.3-3% surfactant, 0.2-0.5% polymer, 0.1-0.5% stabilizer, 0.5-3% solvent and 96-99% water.

11. A solution as in claim 10, comprising about 0.8% surfactant, 0.2% polymer, 0.2% stabilizer, 1.0% solvent, and 97.8% water.

12. A solution as in claim 10, wherein said polymer is Carbopol 941, and said stabilizer is n-dodecyl alcohol.

13. A solution as in claim 12, wherein said solvent is 3-methyl-1-butanol.

14. A solution as in claim 12, wherein said solvent is 2-methyl-1-butanol.

15. A solution as in claim 12, wherein said solvent is 1,1-dimethyl,1,propanol.

16. A solution as in claim 12, wherein said solvent is 1-butanol.

17. A solution as in claim 12, wherein said solvent is 1-pentanol.

18. A method of generating a stabilized aqueous foam comprising simultaneously spraying a solution of claim 10 wherein said solution comprises about 96-99% water by weight and the other concentrate constituents comprises the remaining portion by weight of the solution.

19. A method of visually obscuring an article comprising surrounding the article with a high expansion aqueous foam, the improvement wherein the aqueous foam is that of claim 18.

* * * * *